United States Patent
Shinzato

(10) Patent No.: US 9,645,979 B2
(45) Date of Patent: May 9, 2017

(54) DEVICE, METHOD AND PROGRAM FOR GENERATING ACCURATE CORPUS DATA FOR PRESENTATION TARGET FOR SEARCHING

(71) Applicant: RAKUTEN INC, Tokyo (JP)

(72) Inventor: Keiji Shinzato, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/420,424

(22) PCT Filed: Sep. 30, 2013

(86) PCT No.: PCT/JP2013/076545
§ 371 (c)(1),
(2) Date: Feb. 9, 2015

(87) PCT Pub. No.: WO2015/045155
PCT Pub. Date: Apr. 2, 2015

(65) Prior Publication Data
US 2016/0041951 A1    Feb. 11, 2016

(51) Int. Cl.
*G06F 17/21* (2006.01)
*G06F 17/27* (2006.01)

(52) U.S. Cl.
CPC ........... *G06F 17/218* (2013.01); *G06F 17/21* (2013.01); *G06F 17/274* (2013.01); *G06F 17/2735* (2013.01); *G06F 17/2785* (2013.01)

(58) Field of Classification Search
None
See application file for complete search history.

(56) References Cited

U.S. PATENT DOCUMENTS

| 8,438,469 B1 * | 5/2013 | Scott | G06F 17/24 |
| | | | 715/230 |
| 2010/0030552 A1 * | 2/2010 | Chen | G06F 17/30734 |
| | | | 704/9 |

FOREIGN PATENT DOCUMENTS

JP          200794855 A     4/2007

OTHER PUBLICATIONS

Machine translation for JP 2007-94855, IDS, Apr. 12, 2007.*
International Preliminary Report on Patentability issued from the International Bureau in counterpart International application No. PCT/JP2013/076545, mailed on Apr. 14, 2016.

* cited by examiner

*Primary Examiner* — Qian Yang
(74) *Attorney, Agent, or Firm* — Sughrue Mion, PLLC

(57) ABSTRACT

A corpus generation device according to an embodiment includes a web page acquisition unit, a reference word acquisition unit, an attachment unit and an output unit. The web page acquisition unit acquires a web page including description sentence data regarding a presentation target. The reference word acquisition unit acquires a reference word that is an attribute value regarding the presentation target from the web page. The attachment unit extracts a broader word belonging to a layer above the reference word acquired by the reference word acquisition unit from a storage unit that stores hierarchical relationship information indicating a hierarchical relationship between attribute values, and attaches an attribute tag corresponding to the reference word to the broader word included in the description sentence data. The output unit outputs, as corpus data, the description sentence data to which the attribute tag is attached by the attachment unit.

13 Claims, 19 Drawing Sheets

Fig.5

Tag information

| Place of origin | France, Italy, Burgundy, Côte de Nuits, ··· |
|---|---|
| Type | Red, White, Rosé, ··· |
| Variety | Chardonnay, Merlot, Pinot Noir, ··· |
| ··· | ··· |

(a)

This wine was produced in Burgundy of France.
This wine is comparable to Piedmont wine···    ~D2

(b)

(c)

This wine was produced
in <place of origin> Burgundy </place of origin>
of <place of origin> France </place of origin>.
This wine is comparable to Piedmont wine···    ~C2

Fig.7

Product information

| Store ID | Product ID | Product name | Category | Price | URL | Number of stocks | Product tag |
|---|---|---|---|---|---|---|---|
| S001 | M001 | Product A | ... | ... | ... | ... | Place of origin: France, Burgundy Type: Red |
| S002 | M001 | Product B | ... | ... | ... | ... | Place of origin: Italy, Piedmont Type: Red |
| ... | ... | ... | ... | ... | ... | ... | ... |

In <place of origin> Napa </place of origin>, there is a lot of Bordeaux style wine. ~Cx (b)

In Chile, there is a lot of Bordeaux style wine. ~D3

(c)

In <place of origin> Chile </place of origin>, there is a lot of Bordeaux style wine. ~C3

This wine was produced in the Saint-Estèphe district
of Bordeaux in France. ~D4

(b)

This wine was produced
in the <place of origin> Saint-Estèphe </place of origin>
district of <place of origin> Bordeaux </place of origin>
in <place of origin> France </place of origin>. ~C4

Wine produced in Bordeaux of France.
The winery is a prestigious XXX
of the Saint-Estèphe district located to the north
of the Pauillac district.
— D5

(b)

Wine produced in
<place of origin> Bordeaux </place of origin>
of <place of origin> France </place of origin>.
The winery is a prestigious XXX
of the Saint-Estèphe district located
to the north of the Pauillac district.
— C5

This wine was produced in
<place of origin> Burgundy </place of origin>
of <place of origin> France </place of origin>.
This wine is comparable to
<place of origin> Piedmont <place of origin> wine···

~C6a (b)

This wine was produced in
<place of origin> Burgundy </place of origin>
of <place of origin> France </place of origin>.
This wine is comparable to Piedmont wine···

This wine was produced in Burgundy of France.
This wine is comparable to Piedmont wine··· — D7

(b)

This wine was produced in
<place of origin> Burgundy </place of origin>
of <place of origin> France </place of origin>.
This wine is comparable to Piedmont wine··· — C7

DEVICE, METHOD AND PROGRAM FOR GENERATING ACCURATE CORPUS DATA FOR PRESENTATION TARGET FOR SEARCHING

CROSS REFERENCE TO RELATED APPLICATIONS

This application is a National Stage of International Application No. PCT/JP2013/076545 filed Sep. 30, 2013, the contents of all of which are incorporated herein by reference in their entirety.

TECHNICAL FIELD

One aspect of the present invention relates to a corpus generation device, a corpus generation method and a corpus generation program.

BACKGROUND ART

In electronic commerce sites, a product page including a description sentence for a product in which, for example, a feature of the product that is a presentation target is described is presented to users. Automatically attaching a tag to a phrase indicating the feature of the product included in the description sentence for the product and generating corpus data has been conventionally attempted. According to such corpus data, structured data regarding the product can be automatically generated through machine processing based on the tag.

For example, a technology described in Patent Literature 1 is known as a technology for automatically attaching a tag to a natural sentence such as a description sentence for a product. A sentence processing device that extracts a general-purpose unique representation and a semantic role word from an input document by referring to dictionary data, estimates a sentence structure of the input document based on the general-purpose unique representation and the semantic role word, and attaches a meaning tag to the input document according to a rule defined for a sentence structure in advance is described in Patent Literature 1.

CITATION LIST

Patent Literature

[Patent Literature 1] Japanese Patent Laid-Open Publication No. 2007-94855

SUMMARY OF INVENTION

Technical Problem

However, in the technology described in Patent Literature 1, a phrase such as a unique representation and a semantic role word included in a sentence is extracted by referring to a dictionary. Therefore, when a tag is attached to a description sentence for a presentation target using the technology described in Patent Literature 1, an attribute tag is incorrectly attached to a phrase that does not indicate the feature of the presentation target according to content of the description sentence for the presentation target and, as a result, quality of corpus data may be degraded. Therefore, there is a need for a technology capable of suppressing an attribute tag from being incorrectly attached to the phrase that does not indicate the feature of the presentation target.

Solution to Problem

A corpus generation device according to an aspect of the present invention includes a web page acquisition unit that acquires a web page including description sentence data regarding a presentation target; a reference word acquisition unit that acquires a reference word that is an attribute value regarding the presentation target from the web page; an attachment unit that extracts a broader word belonging to a layer above the reference word acquired by the reference word acquisition unit from a storage unit that stores hierarchical relationship information indicating a hierarchical relationship between attribute values, and attaches an attribute tag corresponding to the reference word to the broader word included in the description sentence data when the broader word is included in the description sentence data; and an output unit that outputs, as corpus data, the description sentence data to which the attribute tag is attached by the attachment unit.

A corpus generation method according to an aspect of the present invention includes a web page acquisition step of acquiring a web page including description sentence data regarding a presentation target; a reference word acquisition step of acquiring a reference word that is an attribute value regarding the presentation target from the web page; an attachment step of extracting a broader word belonging to a layer above the reference word acquired in the reference word acquisition step from a storage unit that stores hierarchical relationship information indicating a hierarchical relationship between attribute values, and attaching an attribute tag corresponding to the reference word to the broader word included in the description sentence data when the broader word is included in the description sentence data; and an output step of outputting, as corpus data, the description sentence data to which the attribute tag is attached in the attachment step.

A corpus generation program according to an aspect of the present invention causes a computer to function as: a web page acquisition unit that acquires a web page including description sentence data regarding a presentation target; a reference word acquisition unit that acquires a reference word that is an attribute value regarding the presentation target from the web page; an attachment unit that extracts a broader word belonging to a layer above the reference word acquired by the reference word acquisition unit from a storage unit that stores hierarchical relationship information indicating a hierarchical relationship between attribute values, and attaches an attribute tag corresponding to the reference word to the broader word included in the description sentence data when the broader word is included in the description sentence data; and an output unit that outputs, as corpus data, the description sentence data to which the attribute tag is attached by the attachment unit.

According to the above aspect, when the broader word of the reference word that is an attribute value regarding the presentation target is included in the description sentence data, the attribute tag corresponding to the reference word is attached to the broader word included in the description sentence data. When the reference word is an attribute value regarding the presentation target, the broader word is also inferred to be the attribute value regarding the presentation target. Therefore, when the attribute tag is attached to the broader word in the description sentence data, it is possible to suppress incorrect attachment of the attribute tag to the phrase that does not indicate the feature of the presentation target. Also, it is possible to generate the corpus data having high quality by outputting the description sentence data of the presentation target to which the attribute tag is attached in this way as corpus data.

In an aspect, when the reference word is included in the description sentence data, the attachment unit may further attach the attribute tag corresponding to the reference word to the reference word included in the description sentence data. According to such an aspect, it is possible to attach an accurate attribute tag to the attribute value of more presentation targets in the description sentence data.

In an aspect, the web page may further include an attribute list in which an attribute name and an attribute value regarding the presentation target are associated, and the reference word acquisition unit may acquire the attribute value in the attribute list as the reference word. A probability of the attribute value in the attribute list being an attribute value regarding the presentation target is high. Therefore, according to this aspect, it is possible to acquire an appropriate reference word.

In an aspect, the reference word acquisition unit may search for a phrase having a high probability of being an attribute value regarding the presentation target from the description sentence data using a sentence structure analyzer, and acquire the searched phrase as the reference word. According to such an aspect, it is possible to acquire the reference word even from the web page that does not include the attribute list.

In an aspect, the hierarchical relationship information may have a tree structure having the attribute value as a node, and the attachment unit may search for a partial tree having the reference word as a root node and having no branch from the hierarchical relationship information, extract one or more attribute values other than the reference word included in the partial tree, and further attach the attribute tag corresponding to the reference word to the one or more attribute values included in the description sentence data when the one or more attribute values are included in the description sentence data. When the reference word is an attribute value regarding the presentation target, the attribute value included in the partial tree having no branch is also inferred to be the attribute value regarding the presentation target. According to such an aspect, it is possible to attach an accurate attribute tag to the attribute value of more presentation targets in the description sentence data.

In an aspect, the hierarchical relationship information may hierarchically indicate the hierarchical relationship between the attribute values, and when there are a plurality of attribute values on a layer directly under the reference word in the hierarchical relationship information and only one of the plurality of attribute values is included in the description sentence data, the attachment unit may further attach the attribute tag corresponding to the reference word to the one attribute value included in the description sentence data. When there are a plurality of attribute values on the layer directly under the reference word and only one of the plurality of attribute values is included in the description sentence, a probability of the one attribute value being an attribute value regarding the presentation target is high. Therefore, according to this aspect, it is possible to attach an accurate attribute tag to the attribute values of more presentation targets in the description sentence data.

In an aspect, a presentation target information registration unit that stores a set of an attribute name and an attribute value regarding the presentation target acquired from the corpus data output from the output unit in association with the web page may be further included. According to such an aspect, it is possible to use the set of the attribute name and the attribute value as a clue of search for the presentation target.

A corpus generation device according to another aspect of the present invention includes: a corpus acquisition unit that acquires corpus data in which an attribute tag is attached to an attribute value; a reference word acquisition unit that acquires a reference word that is an attribute value regarding a presentation target from the corpus data; a removal unit that extracts a broader word belonging to a layer above the reference word acquired by the reference word acquisition unit from a storage unit that stores hierarchical relationship information indicating a hierarchical relationship between attribute values, and removes the attribute tag attached to the attribute value different from the broader word from the corpus data when an attribute value different from the broader word is included in the corpus data; and an output unit that outputs the corpus data from which the attribute tag has been removed by the removal unit.

A corpus generation method according to another aspect of the present invention includes: a corpus acquisition step of acquiring corpus data in which an attribute tag is attached to an attribute value; a reference word acquisition step of acquiring a reference word that is an attribute value regarding a presentation target from the corpus data; a removal step of extracting a broader word belonging to a layer above the reference word acquired in the reference word acquisition step from a storage unit that stores hierarchical relationship information indicating a hierarchical relationship between attribute values, and removing the attribute tag attached to the attribute value different from the broader word from the corpus data when an attribute value different from the broader word is included in the corpus data; and an output step of outputting the corpus data from which the attribute tag has been removed in the removal step.

A corpus generation program according to another aspect of the present invention causes a computer to function as: a corpus acquisition unit that acquires corpus data in which an attribute tag is attached to an attribute value; a reference word acquisition unit that acquires a reference word that is an attribute value regarding a presentation target from the corpus data; a removal unit that extracts a broader word belonging to a layer above the reference word acquired by the reference word acquisition unit from a storage unit that stores hierarchical relationship information indicating a hierarchical relationship between attribute values, and removes the attribute tag attached to the attribute value different from the broader word from the corpus data when an attribute value different from the broader word is included in the corpus data; and an output unit that outputs the corpus data from which the attribute tag has been removed by the removal unit.

According to the above aspect, when the attribute value different from the broader word is included in the corpus data, the attribute tag attached to the attribute value different from the broader word is removed from the corpus data. When the reference word is an attribute value regarding the presentation target, the broader word is also inferred to be the attribute value regarding the product. On the other hand, the attribute value different from the broader word is inferred not to be the attribute value regarding the presentation target. Therefore, it is possible to generate the corpus data to which an attribute tag is accurately attached by removing the attribute tag attached to the attribute value different from the broader word included in the corpus data.

A corpus generation device according to still another aspect of the present invention includes: a web page acquisition unit that acquires a web page including description sentence data regarding a presentation target; a candidate extraction unit that extracts a candidate of an attribute value regarding the presentation target included in the description sentence data by referring to a dictionary data storage unit that stores dictionary data in which an attribute name and the attribute value are associated; a reference word acquisition unit that acquires a reference word that is an attribute value regarding the presentation target from the web page; an attachment unit that extracts a broader word belonging to a layer above the reference word acquired by the reference word acquisition unit from a storage unit that stores hierarchical relationship information indicating a hierarchical relationship between attribute values, and attaches an attribute tag corresponding to the candidate of the attribute value to the candidate of the attribute value matching the broader word among the candidates of the attribute value included in the description sentence data; and an output unit that outputs, as corpus data, the description sentence data to which the attribute tag is attached by the attachment unit.

A corpus generation method according to still another aspect of the present invention includes: a web page acquisition step of acquiring a web page including description sentence data regarding a presentation target; a candidate extraction step of extracting a candidate of an attribute value regarding the presentation target included in the description sentence data by referring to a dictionary data storage unit that stores dictionary data in which an attribute name and the attribute value are associated; a reference word acquisition step of acquiring a reference word that is an attribute value regarding the presentation target from the web page; an attachment step of extracting a broader word belonging to a layer above the reference word acquired in the reference word acquisition step from a storage unit that stores hierarchical relationship information indicating a hierarchical relationship between attribute values, and attaching an attribute tag corresponding to the candidate of the attribute value to the candidate of the attribute value matching the broader word among the candidates of the attribute value included in the description sentence data; and an output step of outputting, as corpus data, the description sentence data to which the attribute tag is attached in the attachment step.

A corpus generation program according to still another aspect of the present invention causes a computer to function as: a web page acquisition unit that acquires a web page including description sentence data regarding a presentation target; a candidate extraction unit that extracts a candidate of an attribute value regarding the presentation target included in the description sentence data by referring to a dictionary data storage unit that stores dictionary data in which an attribute name and the attribute value are associated; a reference word acquisition unit that acquires a reference word that is an attribute value regarding the presentation target from the web page; an attachment unit that extracts a broader word belonging to a layer above the reference word acquired by the reference word acquisition unit from a storage unit that stores hierarchical relationship information indicating a hierarchical relationship between attribute values, and attaches an attribute tag corresponding to the candidate of the attribute value to the candidate of the attribute value matching the broader word among the candidates of the attribute value included in the description sentence data; and an output unit that outputs, as corpus data, the description sentence data to which the attribute tag is attached by the attachment unit.

According to the above-described aspect, the attribute tag corresponding to the reference word is attached to the attribute value matching the broader word among the candidates of the attribute value included in the description sentence data. When the reference word is an attribute value regarding the presentation target, the broader word is also inferred to be the attribute value regarding the presentation target. On the other hand, the attribute value different from the reference word and the broader word is inferred not to be the attribute value regarding the presentation target. In this aspect, since the attribute tag corresponding to the candidate of the attribute value is attached to the candidate of the attribute value matching the broader word among the candidates of the attribute value included in the description sentence data, it is possible to prevent the attribute tag from being incorrectly attached to a phrase that is not the attribute value regarding the presentation target.

Advantageous Effects of Invention

According to one aspect of the present invention, it is possible to suppress an attribute tag from being incorrectly attached to a phrase that does not indicate the feature of the presentation target.

BRIEF DESCRIPTION OF DRAWINGS

FIG. 5 is a diagram illustrating an example of tag information.

FIG. 7 is a diagram illustrating an example of product information.

FIG. 8(*a*) is an example of corpus data that is a machine learning target, FIG. 8(*b*) is an example of description sentence data that is an analysis target, and FIG. 8(*c*) is a diagram illustrating an example of description sentence data to which an attribute tag is attached.

FIG. 10(*a*) is an example of description sentence data included in a product page, and FIG. 10(*b*) is an example of description sentence data to which an attribute tag is attached.

FIG. 11(*a*) is an example of description sentence data included in a product page, and FIG. 11(*b*) is an example of description sentence data to which an attribute tag is attached.

FIG. 15(*a*) is an example of corpus data, and FIG. 15(*b*) is an example of updated corpus data.

FIG. 18(*a*) is an example of description sentence data included in a product page, and FIG. 18(*b*) is an example of description sentence data to which an attribute tag is attached.

DESCRIPTION OF EMBODIMENTS

Hereinafter, embodiments of the present invention will be described in detail with reference to the accompanying drawing. Further, the same or similar elements are denoted with the same reference signs in description of the drawings and repeated description will be omitted.

First Embodiment

Figure 1:
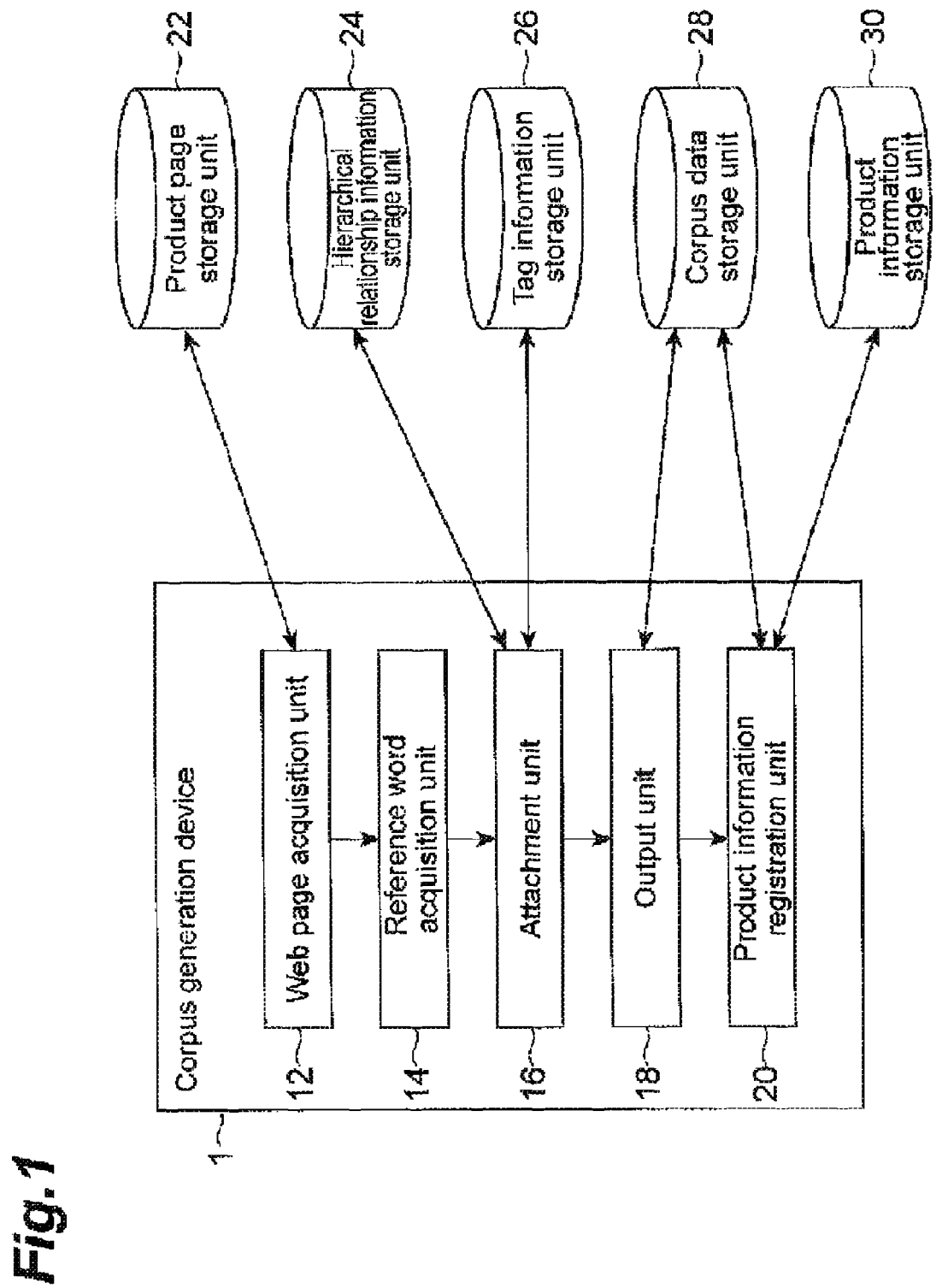
FIG. 1 is a diagram illustrating a functional configuration of a corpus generation device according to a first embodiment.

FIG. 1 is a diagram illustrating a functional configuration of a corpus generation device 1 according to a first embodiment. The corpus generation device 1 includes a web page acquisition unit 12, a reference word acquisition unit 14, an attachment unit 16, an output unit 18, and a product information registration unit (presentation target information registration unit) 20, as illustrated in FIG. 1. The corpus generation device 1 is a device that attaches an attribute tag to description sentence data included in a web page regarding a presentation target, and outputs a description sentence to which the attribute tag is attached as corpus data. While a case in which the presentation target in the web page used for generation of the corpus data is a product will be described hereinafter, the presentation target is not limited to the product.

Figure 2:
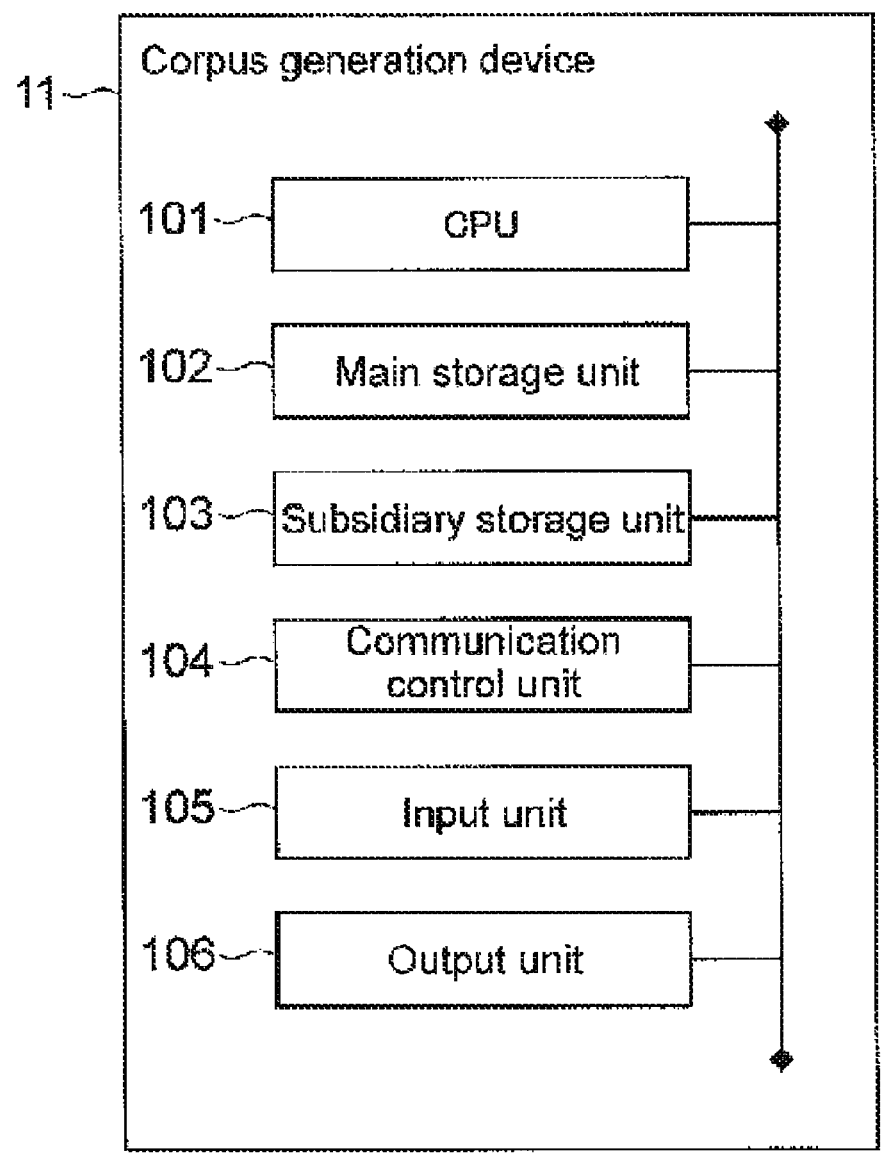
FIG. 2 is a diagram illustrating a hardware configuration of the corpus generation device illustrated in FIG. 1.

This corpus generation device 1 includes a CPU 101 that executes an operating system, an application program or the like, a main storage unit 102 including a ROM or a RAM, a subsidiary storage unit 103 including a hard disk or the like, a communication control unit 104 includes a network card or the like, an input unit 105 such as a keyboard or a mouse, and an output unit 106 such as a monitor, as illustrated in FIG. 2. Each function of this corpus generation device 1 illustrated in FIG. 1 is realized by causing predetermined software to be loaded in the CPU 101 or the main storage unit 102, causing the communication control unit 104, the input unit 105, or the output unit 106 to be operated under control of the CPU 101, and performing reading and writing of data in the main storage unit 102 or the subsidiary storage unit 103. Data or a database necessary for a process is stored in the main storage unit 102 or the subsidiary storage unit 103.

The web page acquisition unit 12 is a functional element that acquires a product page (web page) including description sentence data regarding products. The web page acquisition unit 12 can have access to a product page storage unit 22 and acquires the product page stored in the product page storage unit 22. The web page acquisition unit 12 outputs the acquired product page to the reference word acquisition unit 14.

Figure 3:
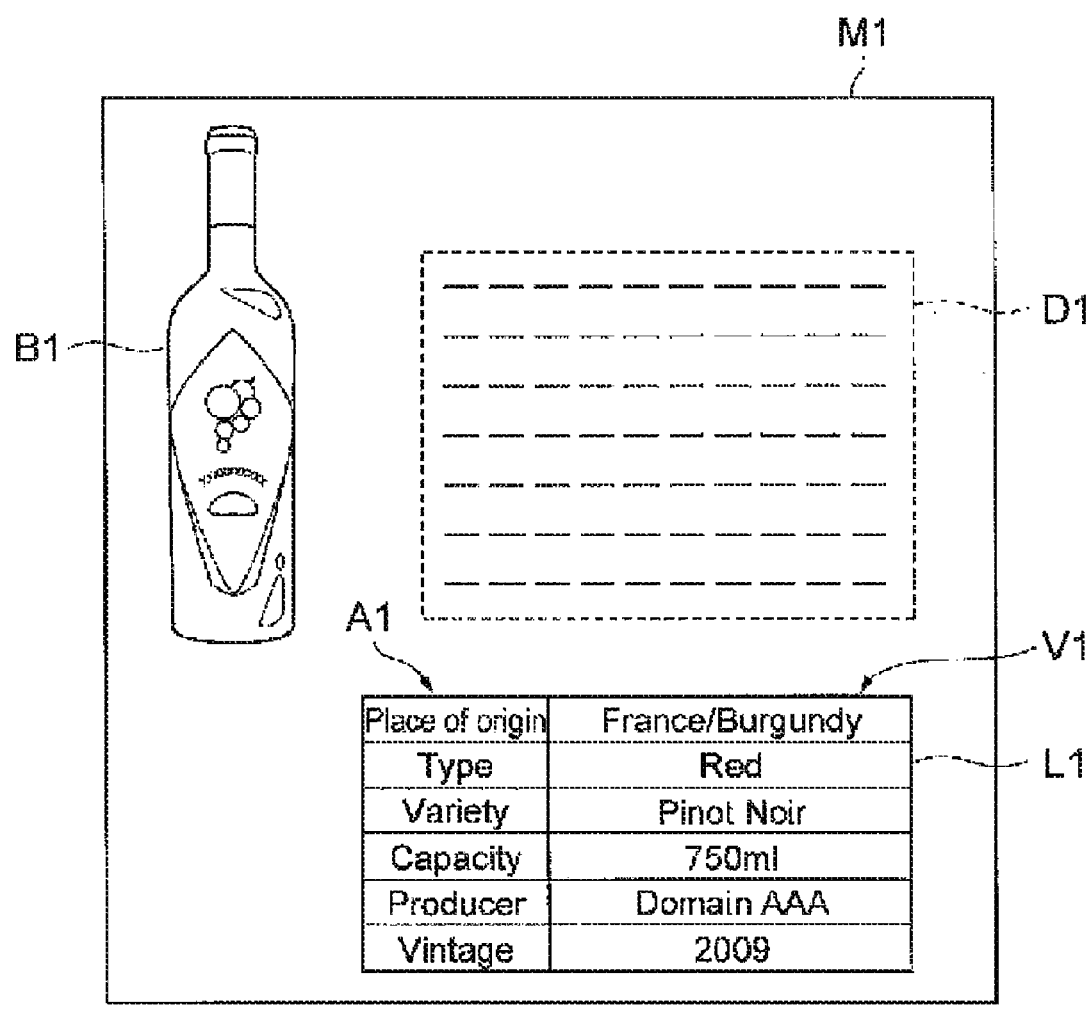
FIG. 3 is a diagram illustrating an example of a product page.

The product page storage unit 22 is a functional element that stores a product page regarding a product that is sold in an electronic commerce site. FIG. 3 illustrates one example of a product page M1 stored in the product page storage unit 22. The product page M1 includes a product image B1, description sentence data D1, and an attribute list L1. The description sentence data D1 is character string data including a natural sentence that describes features or the like of the product sold on the product page M1. The attribute list L1 is a list in which an attribute name A1 and an attribute value V1 regarding the product are associated. Here, the attribute name is an item name of the attribute, and the attribute value is a specific value of the attribute. The attribute list L1 is created by, for example, an operator of a store who sells products.

The reference word acquisition unit 14 is a functional element that acquires a reference word from the web page acquisition unit 12. The reference word is a phrase having a high probability of being the attribute value indicating the feature of the product, and is used as a reference for extracting the attribute value included in the description sentence data D1. In one embodiment, the reference word acquisition unit 14 can acquire the attribute value V1 as a reference word from the attribute list L1 included in the product page output from the web page acquisition unit 12. Since the attribute value V1 included in the attribute list L1 is information registered by the operator of the store selling products, the attribute value is a phrase having a very high probability of being an attribute value indicating the feature of the product sold on the product page M1.

Further, the reference word acquisition unit 14 may acquire the reference word from the description sentence data D1 in the product page M1, rather than from the attribute list L1 included in the product page M1. In this case, the reference word acquisition unit 14 extracts the attribute value having a high probability of being an attribute value indicating the feature of the product as a reference word among the attribute values included in the description sentence data D1 using a sentence structure analyzer. For example, the reference word acquisition unit 14 searches for the description sentence data D1 for a sentence or a phrase in which the attribute name and the attribute value continuously appear and acquires the attribute value as the reference word. For example, when a sentence "Place of origin is Burgundy" is detected from the description sentence data D1, "Burgundy" is detected as the reference word. Further, the reference word acquisition unit 14 may acquire, for example, the reference word from the description sentence using a prefix or a suffix indicating an attribute and added to an attribute value, such as "made in" from "made in France" or "Chateau" from "Chateau Margaux." The reference word acquisition unit 14 outputs information indicating the acquired reference word to the attachment unit 16.

The attachment unit 16 is a functional element that extracts a broader word which is an attribute value belonging to a layer above the reference word acquired by the reference word acquisition unit 14 from hierarchical relationship information stored in a hierarchical relationship information storage unit 24, and attaches an attribute tag corresponding to the reference word to the broader word included in the description sentence data D1. The attachment unit 16 can have access to the hierarchical relationship information storage unit 24 and a tag information storage unit 26.

Figure 4:
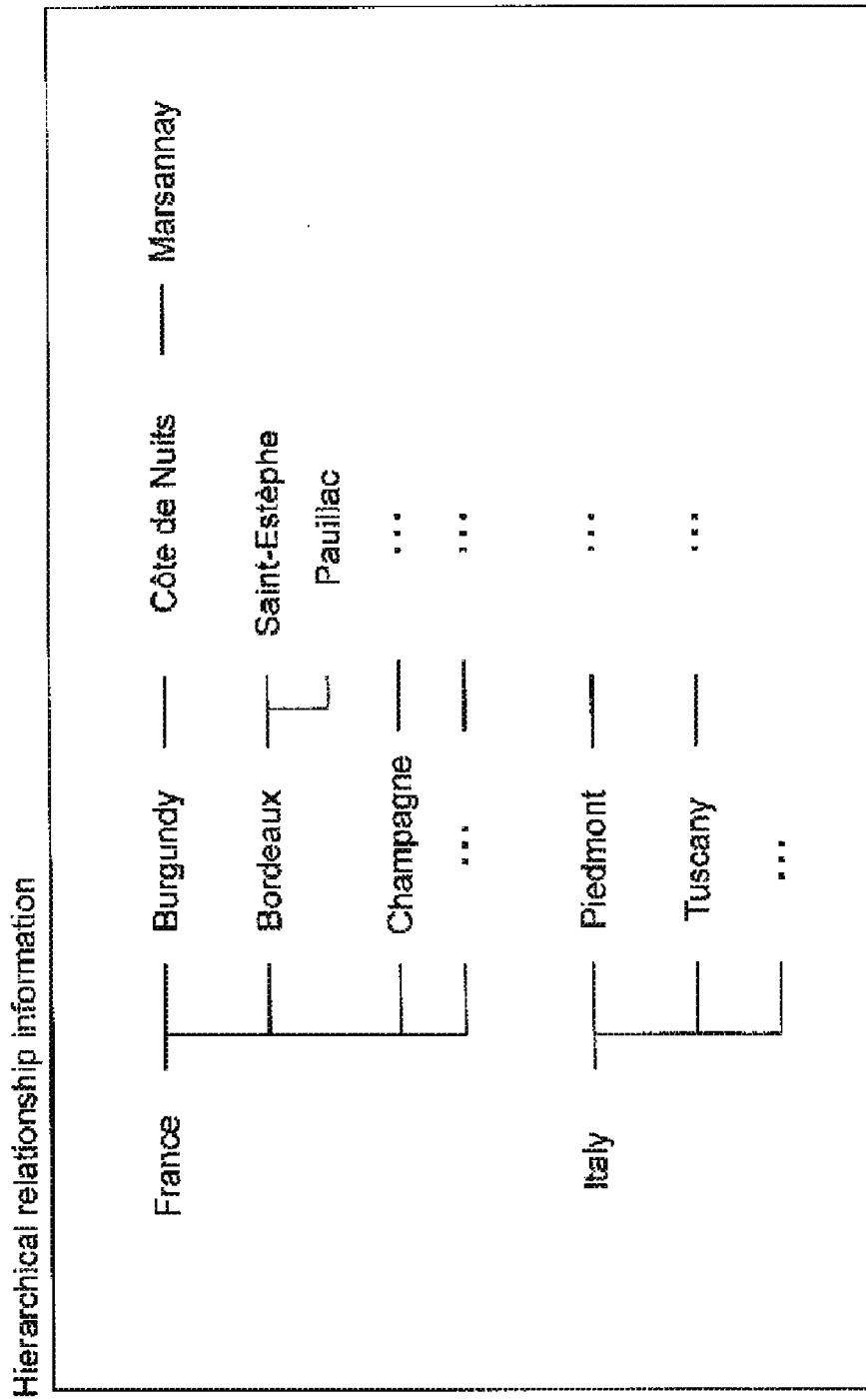
FIG. 4 is a diagram illustrating an example of hierarchical relationship information.

The hierarchical relationship information storage unit 24 stores the hierarchical relationship information that hierarchically indicates a conceptual hierarchical relationship between the attribute values. The concept of the hierarchical relationship referred to herein includes a relationship between an upper layer and a lower layer and a relationship between parts and a whole. The hierarchical relationship information has a plurality of layers and has a tree structure having the attribute value as a node. An attribute value conceptually indicating small division as a hierarchy becomes deeper is stored in the hierarchical relationship information. FIG. 4 is an example conceptually indicating a data structure of the hierarchical relationship information. In the hierarchical relationship information illustrated in FIG. 4, an attribute value "France" is stored on a top layer. Attribute values "Burgundy," "Bordeaux," and "Champagne" that are subdivisions of "France" are stored in a lower layer. Further, an attribute value "Côte de Nuits" that is a subdivision of the attribute value "Burgundy" is stored in a lower layer of the attribute value "Burgundy," and an attribute value "Marsannay" is stored on a lower layer thereof. Further, attribute values "Saint-Estèphe" and "Pauillac" that are subdivisions of "Bordeaux" are stored on a lower layer of the attribute value "Bordeaux." Further, in the hierarchical relationship information illustrated in FIG. 4, an attribute value "Italy" is stored on a top layer as an independent series from the series regarding the attribute value "France." Attribute values "Piedmont" and "Tuscany" indicating a subdivision of the attribute value "Italy" are stored on a lower layer.

The tag information storage unit 26 stores the tag information in which the attribute name and the attribute value are associated. FIG. 5 is a diagram illustrating an example of the tag information. The tag information does not have a hierarchical structure unlike the hierarchical relationship information as illustrated in FIG. 5, and a plurality of attribute values are associated with one attribute name. In the tag information illustrated in FIG. 5, "France, Italy, Burgundy, and Côte de Nuits" are associated with the attribute name "Place of origin" as attribute values. This tag information shows, for example, that phrases "France," "Italy," "Burgundy" and "Côte de Nuits" are attribute values indicating "Place of origin." Further, in the tag information illustrated in FIG. 5, corresponding attribute values are associated with attribute names "Type" and "Variety."

Figure 6:
FIG. 6(*a*) is an example of description sentence data included in a product page, FIG. 6(*b*) is an example of an attribute list, and FIG. 6(*c*) is a diagram illustrating an example of corpus data output by an output unit.

Hereinafter, an example in which the attachment unit 16 attaches an attribute tag to the description sentence data will be described in detail with reference to FIGS. 4 to 6.

FIG. 6(a) is a diagram illustrating an example of description sentence data D2 included in a product page. The description sentence data D2 includes "France," "Burgundy" and "Piedmont" as phrases regarding a place of origin. FIG. 6(b) is a diagram illustrating an example of an attribute list L2 included in the product page. The attribute value included in the attribute list L2 is acquired by the reference word acquisition unit 14 described above and is output to the attachment unit 16. Hereinafter, an example in which the reference word acquisition unit 14 outputs "Burgundy" that is the attribute value V2 included in the attribute list L2 to the attachment unit 16 as the reference word will be described.

The attachment unit 16 searches for "Burgundy" that is the reference word from the hierarchical relationship information, and extracts the broader word belonging to the layer above "Burgundy." Since the attribute value "Burgundy" is included in a layer directly under a top layer in the hierarchical relationship information illustrated in FIG. 4, the attachment unit 16 extracts "France" belonging to an upper layer of "Burgundy" as a broader word. Then, the attachment unit 16 acquires an attribute name corresponding to the reference word "Burgundy" by referring to the tag information stored in the tag information storage unit 26. In the tag information illustrated in FIG. 5, an attribute name "Place of origin" is associated with the reference word "Burgundy." When the attachment unit 16 acquires the attribute name corresponding to the broader word and the reference word in this way, the attachment unit 16 attaches the attribute tag indicating the attribute name corresponding to the reference word to the broader word included in the description sentence data D2.

Further, in an embodiment, the attachment unit 16 may further add an attribute tag corresponding to the reference word to the reference word included in the description sentence data D2. In this case, the attachment unit 16 gives an attribute name "Place of origin" corresponding to the reference word "Burgundy" to the description sentence data D2 by referring to the tag information storage unit 26.

FIG. 6(c) is a diagram illustrating an example of description sentence data C2 to which the attribute tag is attached by the attachment unit 16. As illustrated in FIG. 6(c), in the description sentence data C2, an attribute tag "<place of origin> . . . </place of origin>" indicating the attribute name "Place of origin" is applied to the broader word "France" and the reference word "Burgundy" in the description sentence data C2. Further, the attachment unit 16 does not attach the attribute tag regarding the place of origin to a phrase "Piedmont" included in the description sentence data D2. This is because "Piedmont" is neither the broader word nor the reference word, and thus "Piedmont" is not an attribute value indicating the feature of the product, even though "Piedmont" is a phrase regarding a place of origin.

Further, the attribute tag indicating the attribute name may not necessarily be acquired from the tag information storage unit 26. For example, the attachment unit 16 may acquire the attribute name A2 corresponding to the attribute value V2 that is the reference word in the attribute list L2 as the attribute name and attach the attribute tag indicating the attribute name to the reference word and the broader word. When "Burgundy" is acquired as the reference word from the attribute list L2 in the example illustrated in FIG. 6(b), the attachment unit 16 acquires the attribute name "Place of origin" corresponding to the attribute value "Burgundy" in the attribute list L2 and attaches the attribute tag corresponding to the attribute name "Place of origin" to the broader word and the reference word in the description sentence data D2.

Referring back to FIG. 1, the attachment unit 16 outputs the description sentence data C2 to which the attribute tag is attached as described above to the output unit 18. The output unit 18 outputs the description sentence data C2 with the attribute tag output from the attachment unit 16 to the corpus data storage unit 28 as corpus data. The corpus data storage unit 28 is a functional element that stores the corpus data output from the output unit 18.

The product information registration unit 20 is a functional element that stores a product tag including a set of an attribute name and an attribute value acquired from the corpus data output from the output unit 18 in association with the product page. The product information registration unit 20 can have access to the corpus data storage unit 28 and the product information storage unit 30.

The product information storage unit 30 is a functional element that stores the product information regarding the product sold in a virtual shop. FIG. 7 is a diagram illustrating an example of the product information. Each of records of the product information illustrated in FIG. 7 includes a store ID of a virtual shop providing a product, a product ID that uniquely identifies a product, a product name, a category, a price, a URL of the product page, the number of stocks, and a product tag. However, the information included in the product information is not limited thereto.

The product information registration unit 20 acquires the corpus data from the corpus data storage unit 28, and acquires the set of the attribute name and the attribute value using the attribute tag given to the corpus data. Also, the product information registration unit 20 extracts the record of the product information corresponding to the product page from which the corpus data is acquired, and registers the set of the attribute name and the attribute value in the product tag of the record. This product tag is used as a key for narrowing down product pages desired by a user from an electronic commerce site.

Further, the corpus data stored in the corpus data storage unit 28 can build, for example, an analysis device that automatically generates an attribute list using machine learning. The attribute list can be automatically generated from the description sentence data included in the product page using such an analysis device. For example, the analysis device comes to be able to recognize a place in which the attribute value of "Place of origin" appears in context when the machine learning is applied using corpus data CX as illustrated in FIG. 8(*a*).

When the analysis device performs analysis of the description sentence data D3 illustrated in FIG. 8(*b*) after applying the machine learning using such corpus data CX, the analysis device can detect that "Chile" is an attribute value indicating "Place of origin" from a structure, context and the like of the sentence, and generate output data C3 in which a tag "<place of origin> . . . </place of origin>" is given to a part of "Chile" as illustrated in FIG. 8(*c*). Also, the analysis device can generate the attribute list in which the attribute name "Place of origin" and the attribute value "Chile" are associated with each other based on the output data C3. Accordingly, even when the product page in which the description sentence data D3 is included does not have the attribute list, the attribute list in which the attribute name "Place of origin" and attribute value "Chile" are associated can be caused to be included in the product page.

Further, the process of giving the attribute tag in the attachment unit 16 can be changed in various aspects. Hereinafter, a first variant of the attachment unit 16 will be described.

(First Variant)

Figure 9:
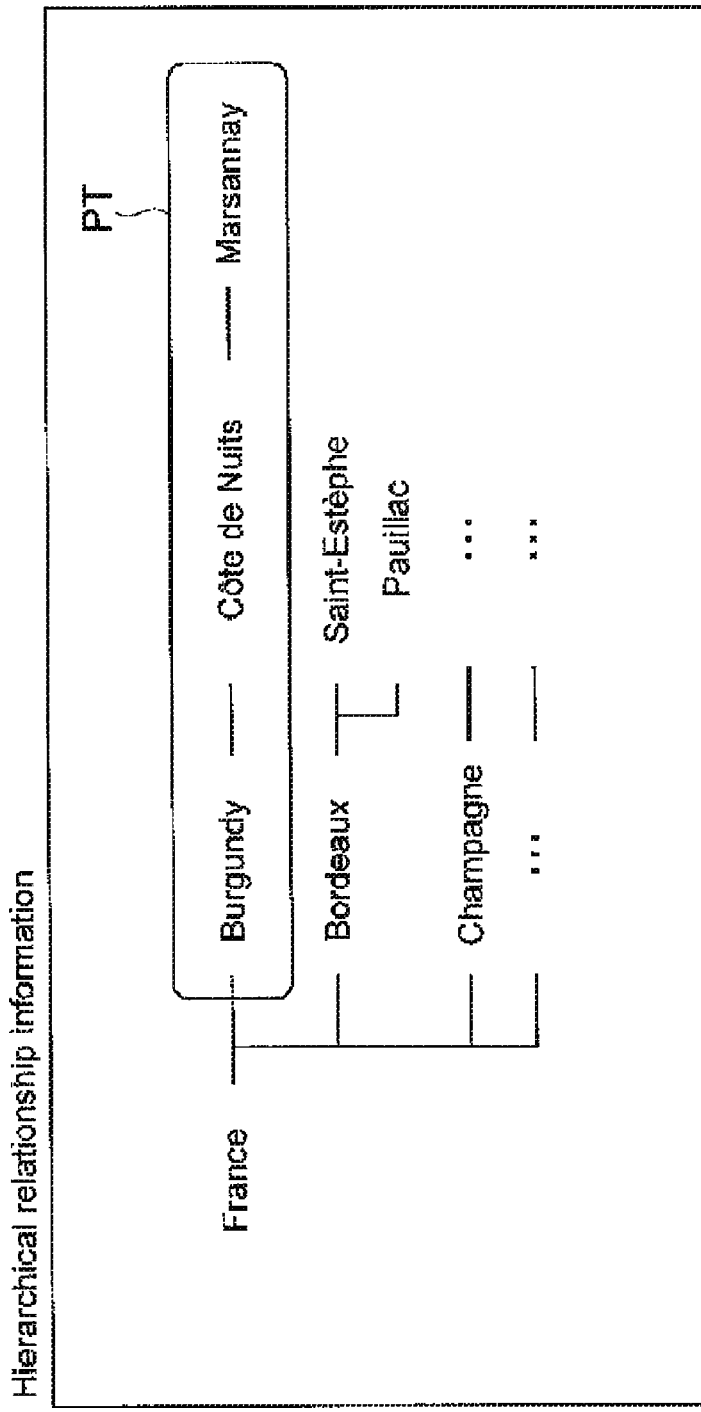
FIG. 9 is a diagram illustrating an example of hierarchical relationship information.

The attachment unit 16 according to a first variant searches for a partial tree having a reference word as a root node and having no branch from the hierarchical relationship information, extracts one or more attribute values other than the reference word included in the partial tree, and further attaches the attribute tag corresponding to the reference word to the one or more attribute values included in the description sentence data. Hereinafter, a process of the attachment unit 16 according to the first variant will be described in detail with reference to FIG. 9. FIG. 9 is a diagram illustrating another example of the hierarchical relationship information.

For example, when the reference word is "Burgundy," the attachment unit 16 extracts a partial tree PT including, as nodes, "Burgundy," "Côte de Nuits" and "Marsannay," which is a partial tree having "Burgundy" as the root node and having no branch. Then, the attribute values other than "Burgundy," which is the reference word, included in the partial tree PT, that is, "Côte de Nuits" and "Marsannay," are extracted. Then, the attachment unit 16 acquires the attribute name "Place of origin" corresponding to the reference word "Burgundy" by referring to the tag information stored in the tag information storage unit 26. The attachment unit 16 also attaches the attribute tag "Place of origin" to "Côte de Nuits" and "Marsannay" in addition to the reference word "Burgundy" and the broader word "France" included in the description sentence data.

Further, in the first variant, when the reference word is "Bordeaux," and there is no partial tree having "Bordeaux" as the root node and having no branch. That is, there are a plurality of attribute values "Saint-Estèphe" and "Pauillac" on a layer directly under "Bordeaux," and there is no partial tree having no branch. Therefore, in this case, the attachment unit 16 attaches the attribute tag "Place of origin" only to the reference word "Bordeaux" and the broader word "France" included in the description sentence data.

Action effects of this variant will be described. When the reference word is an attribute value regarding the product, an attribute value included in the partial tree PT having no branch is inferred to be the attribute value regarding the product. Thus, the attachment unit 16 according to the first variant can attach correct attribute tags to the attribute values of more products in the description sentence data.

Next, a second variant of the attachment unit 16 will be described.

(Second Variant)

When there are a plurality of attribute values on a layer directly under the reference word in the hierarchical relationship information and only one attribute value among the plurality of attribute values is included in the description sentence data, the attachment unit 16 according to the second variant attaches the attribute tag corresponding to the reference word to one attribute value included in the description sentence data. A process of the attachment unit 16 according to attachment unit 16 according to the second variant will be described with reference to FIGS. 9 to 11.

FIG. 10(*a*) illustrates an example of description sentence data D4 included in a product page. The description sentence data D4 includes "France," "Bordeaux" and "Saint-Estèphe" as phrases regarding a place of origin. Here, for example, when a reference word is "Bordeaux," the attachment unit 16 searches for an attribute value belonging to a layer directly under the reference word "Bordeaux." In the hierarchical relationship information illustrated in FIG. 9, there are two attribute values of "Saint-Estèphe" and "Pauillac" on a lower layer of "Bordeaux." The description sentence data D4 includes only "Saint-Estèphe" that is one attribute place among the two attribute values. In this case, the attachment unit 16 regards "Saint-Estèphe" as an attribute value regarding the product and attaches an attribute tag corresponding to the reference word. FIG. 10(*b*) illustrates description sentence data C4 in which an attribute tag is attached to the description sentence data D4 by the attachment unit 16 of this variant. As illustrated in FIG. 10(*b*), in the description sentence data C4, the attribute tag "<place of origin> . . . </place of origin>" indicating the attribute name "Place of origin" is attached to the attribute value "Saint-Estèphe," in addition to the broader word "France" and the reference word "Bordeaux" in the description sentence data C4.

FIG. 11(*a*) illustrates another example of the description sentence data included in the product page. This description sentence data D5 includes "France," "Bordeaux," "Saint-Estèphe" and "Pauillac" as phrases regarding a place of origin. This description sentence data D5 includes a plurality of attribute values "Saint-Estèphe" and "Pauillac" belonging to a layer directly under the reference word "Bordeaux." In this case, since it is difficult to determine which of "Saint-Estèphe" and "Pauillac" is the attribute value regarding the product, the attachment unit 16 does not attach the attribute tag to "Saint-Estèphe" and "Pauillac" and attaches the attribute tag "Place of origin" to only the reference word "Bordeaux" and the broader word "France." FIG. 11(b) illustrates description sentence data C5 in which an attribute tag is attached to the description sentence data D5 by the attachment unit 16 of this variant. As illustrated in FIG. 11(b), in the description sentence data C5, the attribute tag "<place of origin> . . . </place of origin>" indicating the attribute name "Place of origin" is attached to only the broader word "France" and the reference word "Bordeaux" in the description sentence data C4. On the other hand, a sentence including "Saint-Estèphe" and "Pauillac" that are narrower words of the reference word "Bordeaux" may not be included in the final corpus. This is intended to improve quality of the corpus.

An action and effects of this variant will be described. Even when there are a plurality of attribute values on a layer directly below the reference word, probability of the attribute value being an attribute value regarding the product is high if only one of the plurality of attribute values is included in the description sentence. Therefore, according to this aspect, it is possible to attach an accurate attribute tag to attribute values of more products in the description sentence data.

Figure 12:
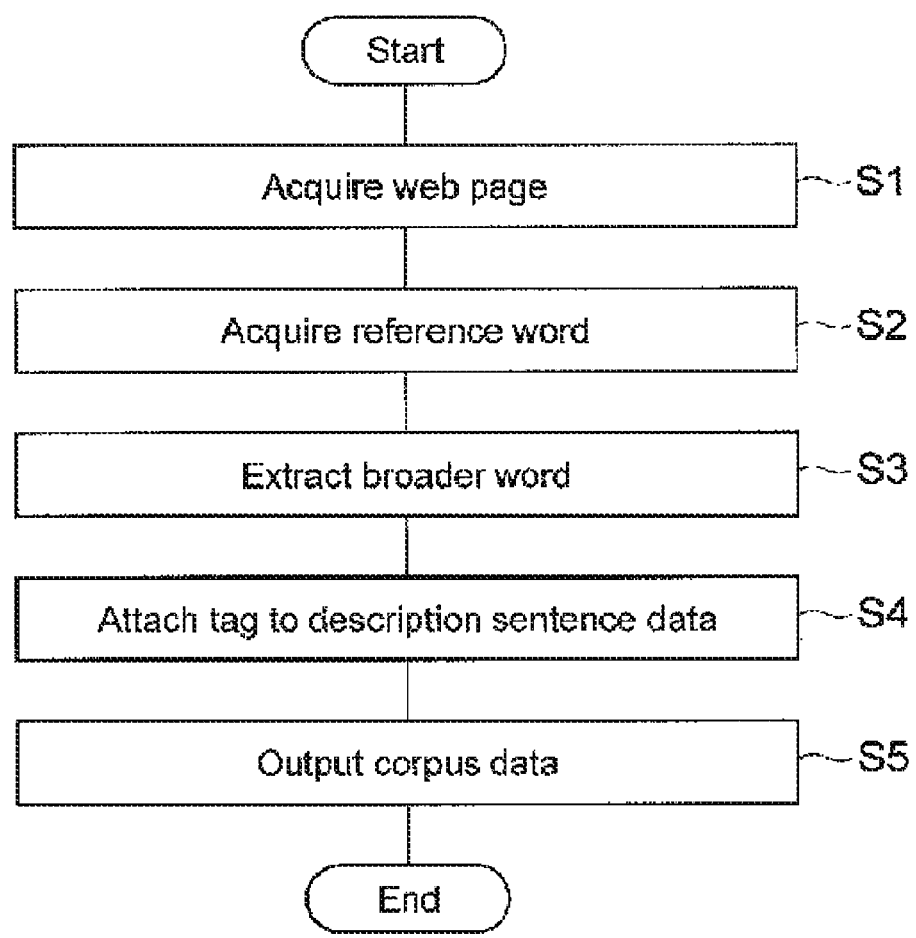
FIG. 12 is a flow diagram illustrating a process of a corpus generation method according to a first embodiment.

Next, an operation of the corpus generation device 1 and a corpus generation method according to the first embodiment will be described using FIG. 12.

First, the web page acquisition unit 12 of the corpus generation device 1 acquires the web page including the description sentence data regarding the product from the product page storage unit 22 (step S1, web page acquisition step). Then, the reference word acquisition unit 14 acquires the reference word from the web page acquired in step S1 (step S2; reference word acquisition step). In this case, the reference word can be acquired from the attribute list included within the web page. Then, the attachment unit 16 extracts the broader word which is an attribute value belonging to the layer above the reference word acquired in step S2 from the hierarchical relationship information stored in the hierarchical relationship information storage unit 24 (step S3).

The attachment unit 16 then attaches the attribute tag corresponding to the reference word to the broader word included in the description sentence data of the product page (step S4; attaching step). Further, in this case, the attribute tag corresponding to the reference word may be applied to the reference word included in the description sentence data of the product page. Further, the attachment unit 16 may search for the partial tree having the reference word as the root node and having no branch from the hierarchical relationship information, and extract one or more attribute values other than the reference word included in the partial tree, and further attach the attribute tag corresponding to the reference word to the one or more attribute values included in the description sentence data. Alternatively, when there are a plurality of attribute values on a layer directly under the reference word in the hierarchical relationship information and only one attribute value among the plurality of attribute values is included in the description sentence data, the attachment unit 16 may also attach the attribute tag corresponding to the reference word to one attribute value included in the description sentence data.

Then, the output unit 18 stores the description sentence data to which the attribute tag is attached in step S4 in the corpus data storage unit 28 as the corpus data (step S5; output step). Thus, the corpus generation device 1 generates the corpus data.

Figure 13:
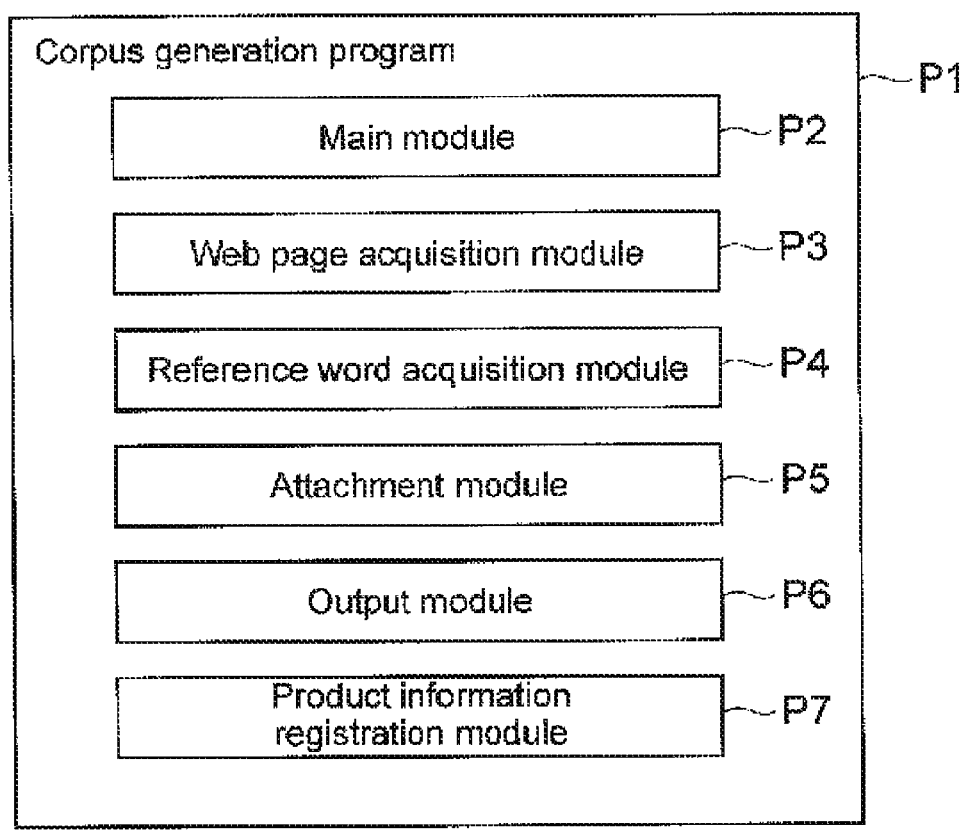
FIG. 13 is a diagram illustrating a configuration of a corpus generation program according to the first embodiment.

Next, the corpus generation program P1 for causing a computer to execute a series of processes described above will be described using FIG. 13. FIG. 13 is a diagram illustrating a configuration of the corpus generation program P1 according to an embodiment. Further, the computer can be caused to operate as the corpus generation device 1 having the above-described function by applying this program to the computer.

The corpus generation program P1 includes a main module P2, a web page acquisition module P3, a reference word acquisition module P4, an attachment module P5, an output module P6, and a product information registration module P7.

The main module P2 is a part that generally controls a process. A function realized by executing the web page acquisition module P3, the reference word acquisition module P4, the attachment module P5, the output module P6, and the product information registration module P7 is the same as the function of the web page acquisition unit 12, the reference word acquisition unit 14, the attachment unit 16, the output unit 18 and the product information registration unit 20.

For example, the corpus generation program P1 is recorded on a tangible recording medium such as a CD-ROM, a DVD-ROM, or a semiconductor memory and provided. Further, the corpus generation program P1 may be provided as a data signal superimposed on carrier waves over a network N.

As described above, according to the corpus generation device 1, when the broader word of the reference word that is an attribute value regarding the presentation target is included in the description sentence data, the attribute tag corresponding to the reference word is attached to the broader word included in the description sentence data. When the reference word is an attribute value regarding the presentation target, the broader word is inferred to be the attribute value regarding the presentation target. Therefore, when the attribute tag is attached to the broader word in the description sentence data, it is possible to suppress incorrect attachment of the attribute tag to the phrase that does not indicate the feature of the presentation target. Also, it is possible to generate the corpus data having high quality by outputting the description sentence data of the presentation target to which the attribute tag is attached in this way as corpus data. Further, the attachment unit 16 can attach the correct attribute tag to the attribute values of more products in the description sentence data since the attachment unit 16 attaches the attribute tag corresponding to the reference word to the reference word included in the description sentence data.

Further, in the corpus generation device 1, the reference word acquisition unit 14 acquires the attribute value in the attribute list as the reference word. Since the probability of the attribute value of the product in the attribute list being an attribute value regarding the product is high, the corpus generation device 1 can acquire an appropriate reference word.

Second Embodiment

Next, the corpus generation device 1A according to a second embodiment will be described. The corpus generation device 1A is a device that removes the attribute tag attached to the attribute value different from the broader word from the corpus data in which the attribute tag has been already given. Hereinafter, matters different from the first embodiment will be mainly described, and a description of matters that are the same as or similar to those in the first embodiment will be omitted.

Figure 14:
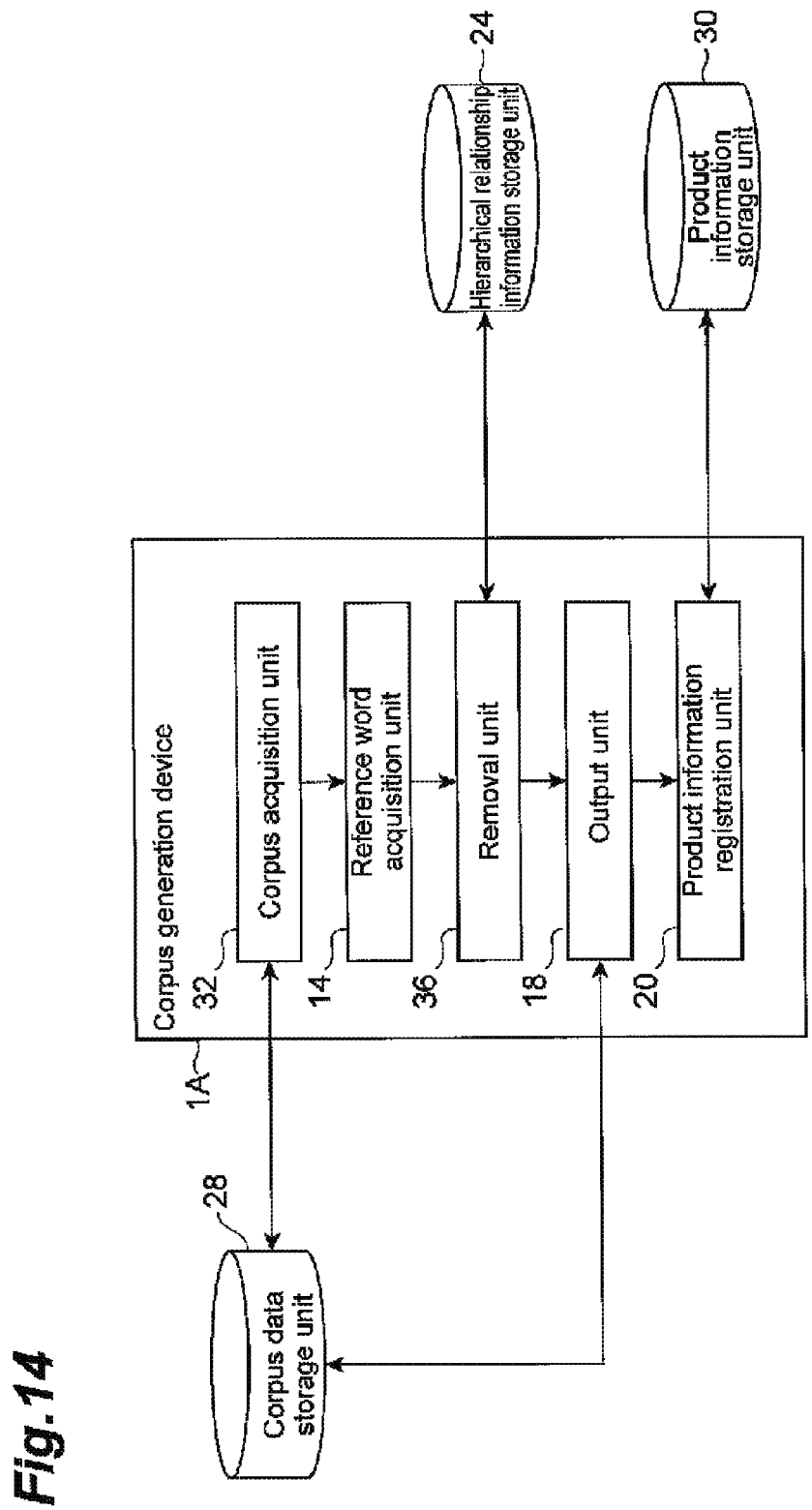
FIG. 14 is a diagram illustrating a functional configuration of a corpus generation device according to a second embodiment.

FIG. 14 is a diagram illustrating a functional configuration of a corpus generation device 1A. The corpus generation device 1A includes a corpus acquisition unit 32, a reference word acquisition unit 14, a removal unit 36, an output unit 18 and a product information registration unit 20, as illustrated in FIG. 14.

The corpus acquisition unit 32 is a functional element that acquires corpus data in which the attribute tag is attached to the attribute value from the corpus data storage unit 28. The corpus data acquired by the corpus acquisition unit 32 may be text data in which the attribute tag is attached to the attribute value included in the description sentence data or may be web page data that includes description sentence data and an attribute list and in which the attribute tag is attached to an attribute value included in the description sentence data.

The reference word acquisition unit 14 is a functional element that acquires a reference word that is an attribute value regarding the product from the corpus data acquired by the corpus acquisition unit 32. For example, when the corpus data acquired by the corpus acquisition unit 32 is the web page data including the description sentence data and the attribute list, the reference word acquisition unit 14 can acquire the attribute value as a reference word from the attribute list included in the corpus data. Further, for example, for example, when the corpus data acquired by the corpus acquisition unit 32 is the text data in which the attribute tag is attached to the attribute value included in the description sentence data, the reference word acquisition unit 14 can extract, as the reference word, an attribute value having a high probability of being an attribute value indicating the feature of the from among the attribute values included in the corpus data using a sentence structure analyzer.

The removal unit 36 is a functional element that extracts a broader word belonging to a layer above the reference word acquired by the reference word acquisition unit 14 from the hierarchical relationship information storage unit 24 that stores hierarchical relationship information indicating a hierarchical relationship between attribute values, and removes the attribute tag attached to the attribute value different from the broader word from the corpus data when the attribute value different from the broader word is included in the corpus data. When the reference word is included in the corpus data, the removal unit 36 may leave the attribute tag attached to the reference word without removing the attribute tag attached to the reference word from the corpus data.

Hereinafter, an example in which the removal unit 36 removes the attribute tag from the corpus data will be described in detail with reference to FIGS. 4, 5, and 15. Here, when the attribute value different from the broader word and the reference word is included in the corpus data, the removal unit 36 is assumed to remove the attribute tag attached to the attribute value different from the broader word and the reference word from the corpus data.

FIG. 15(a) is a diagram illustrating an example of corpus data C6a acquired by the corpus acquisition unit 32. In the corpus data C6a, the attribute tag "<place of origin> . . . <place of origin>" indicating the attribute name "Place of origin" is attached to phrases "France," "Burgundy" and "Piedmont" in the corpus data C6a. Here, a case in which the reference word acquisition unit 14 outputs "Burgundy" from the corpus data C6a to the attachment unit 16 as the reference word will be described.

The removal unit 36 searches "Burgundy" that is the reference word from the hierarchical relationship information, and extracts the broader word belonging to the layer above "Burgundy." In the hierarchical relationship information illustrated in FIG. 4, since the reference word "Burgundy" is included in a layer directly under a top layer, the attachment unit 16 extracts "France" belonging to the upper layer of "Burgundy" as the broader word. Then, the removal unit 36 acquires a phrase to which an attribute tag is attached in the corpus data C6a and searches for a phrase different from the broader word. Here, among phrases "France," "Burgundy" and "Piedmont" to which an attribute tag is attached in the corpus data C6a, "France" is the same as the broader word and "Burgundy" is the same as the reference word, but "Piedmont" is different from both the broader word and the reference word. Therefore, the removal unit 36 removes the attribute tag attached to the phrase "Piedmont" included in the corpus data C6a.

FIG. 15(b) is a diagram illustrating an example of corpus data C6b from which the attribute tag has been removed by the removal unit 36. In the corpus data C6b, the attribute tags attached to the phrases "France" and "Burgundy" are maintained, but the attribute tag attached to the phrase "Piedmont" is removed, as illustrated in FIG. 15(b). This is because "Piedmont" is different from the broader word and the reference word, and thus "Piedmont" is inferred not to be an attribute value indicating the feature of the product.

The removal unit 36 outputs the corpus data from which some of the attribute tags have been removed to the output unit 18. The output unit 18 outputs the corpus data output from the removal unit 36 to the corpus data storage unit 28 and updates the corpus data in the corpus data storage unit 28. Since a function of the product information registration unit 20 is as described in the first embodiment, a description thereof will be omitted.

Further, in an embodiment, the removal unit 36 may search for a partial tree having the reference word as a root node and having no branch from the hierarchical relationship information, extract one or more attribute values other than the reference word included in the partial tree, and leave the attribute tag attached to one or more attribute values without removing the attribute tag attached to one or more attribute values from the corpus data. Further, when there are a plurality of attribute values on a layer directly under the reference word in the hierarchical relationship information and only one of the plurality of attribute values is included in the corpus data, the removal unit 36 may leave the attribute tag attached to the one attribute value without removing the attribute tag attached to the one attribute value from the corpus data.

Figure 16:
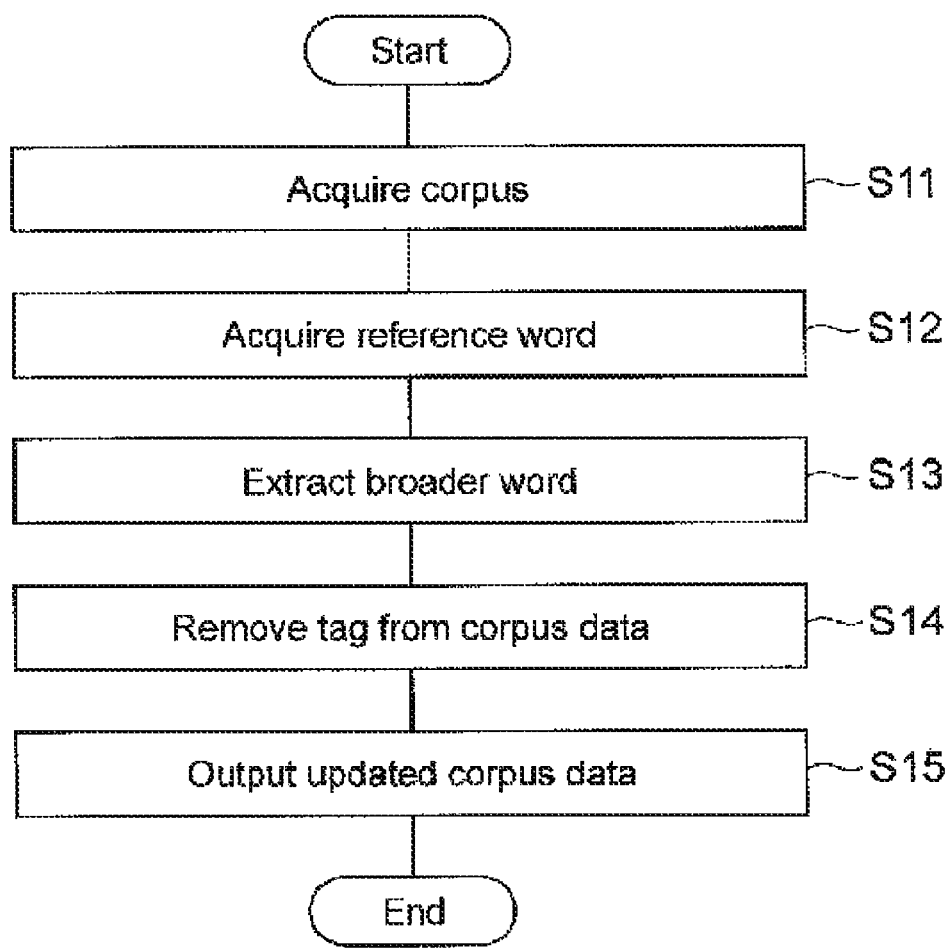
FIG. 16 is a flow diagram illustrating a process of a corpus generation method according to the second embodiment.

Next, an operation of the corpus generation device 1A, and a corpus generation method according to the second embodiment will be described using FIG. 16.

First, the corpus acquisition unit 32 of the corpus generation device 1A acquires the corpus data in which the attribute tag is attached to the attribute value from the corpus data storage unit 28 (step S11, corpus acquisition step). Then, the reference word acquisition unit 14 acquires the reference word from the corpus data acquired in step S1 (step S12). Then, the removal unit 36 extracts the broader word that is an attribute value belonging to the layer above the reference word acquired in step S12 from the hierarchical relationship information stored in the hierarchical relationship information storage unit 24 (step S13).

Thereafter, when the attribute value different from the broader word is included in the corpus data, the removal unit 36 removes the attribute tag attached to the attribute value different from the broader word from the corpus data (step S14; removal step). Further, in this case, when the attribute value different from the reference word is included in the corpus data, the removal unit 36 leaves the attribute tag attached to the reference word without removing the attribute tag attached to the reference word from the corpus data. Further, the removal unit 36 may search for a partial tree having the reference word as the root node and having no branch from the hierarchical relationship information, extract one or more attribute values other than the reference word included in the partial tree, and leave the attribute tag attached to the one or more attribute values without removing the attribute tag attached to the one or more attribute values from the corpus data. Alternatively, when there are a plurality of attribute values on a layer directly under the reference word in the hierarchical relationship information and only one of the plurality of attribute values is included in the corpus data, the removal unit 36 may leave the attribute tag attached to the one attribute value without removing the attribute tag attached to the one attribute value from the corpus data.

Then, the output unit 18 stores the corpus data from which the attribute tag has been removed in step S14 in the corpus data storage unit 28 (step S15). As described above, the corpus generation device 1A generates updated corpus data.

Next, a corpus generation program according to the second embodiment will be described.

The corpus generation program includes a main module, a corpus acquisition module, a reference word acquisition module, a removal module, an output module, and a product information registration module.

The main module is a part that generally controls the corpus generation program. Functions realized by executing the corpus acquisition module, the reference word acquisition module, the removal module, the output module and the product information registration module are the same as the functions of the corpus acquisition unit 32, the reference word acquisition unit 14, the removal unit 36, the output unit 18 and the product information registration unit 20 described above.

The corpus generation program according to this embodiment can be distributed using various methods, similar to the generation program P1 of the first embodiment.

As described above, according to the corpus generation device 1A, when the attribute value different from the broader word is included in the corpus data, the attribute tag attached to the attribute value different from the broader word is removed from the corpus data. When the reference word is an attribute value regarding the product, the broader word is inferred to be the attribute value regarding the product. On the other hand, the attribute value different from the reference word and the broader word is inferred not to be the attribute value regarding the product. Therefore, it is possible to generate the corpus data to which an attribute tag is accurately attached by removing the attribute tag attached to the attribute value different from the broader word included in the corpus data.

Third Embodiment

Next, a corpus generation device 1B according to a third embodiment will be described. The corpus generation device 1B is a device that extracts a candidate of the attribute value from the web page including description sentence data using dictionary data, and attaches an attribute tag to the candidate of the attribute value matching the broader word among the candidates of the attribute value included in the description sentence data. Hereinafter, matters different from the first embodiment will be mainly described, and a description of matters that are the same as or similar to those in the first embodiment will be omitted.

Figure 17:
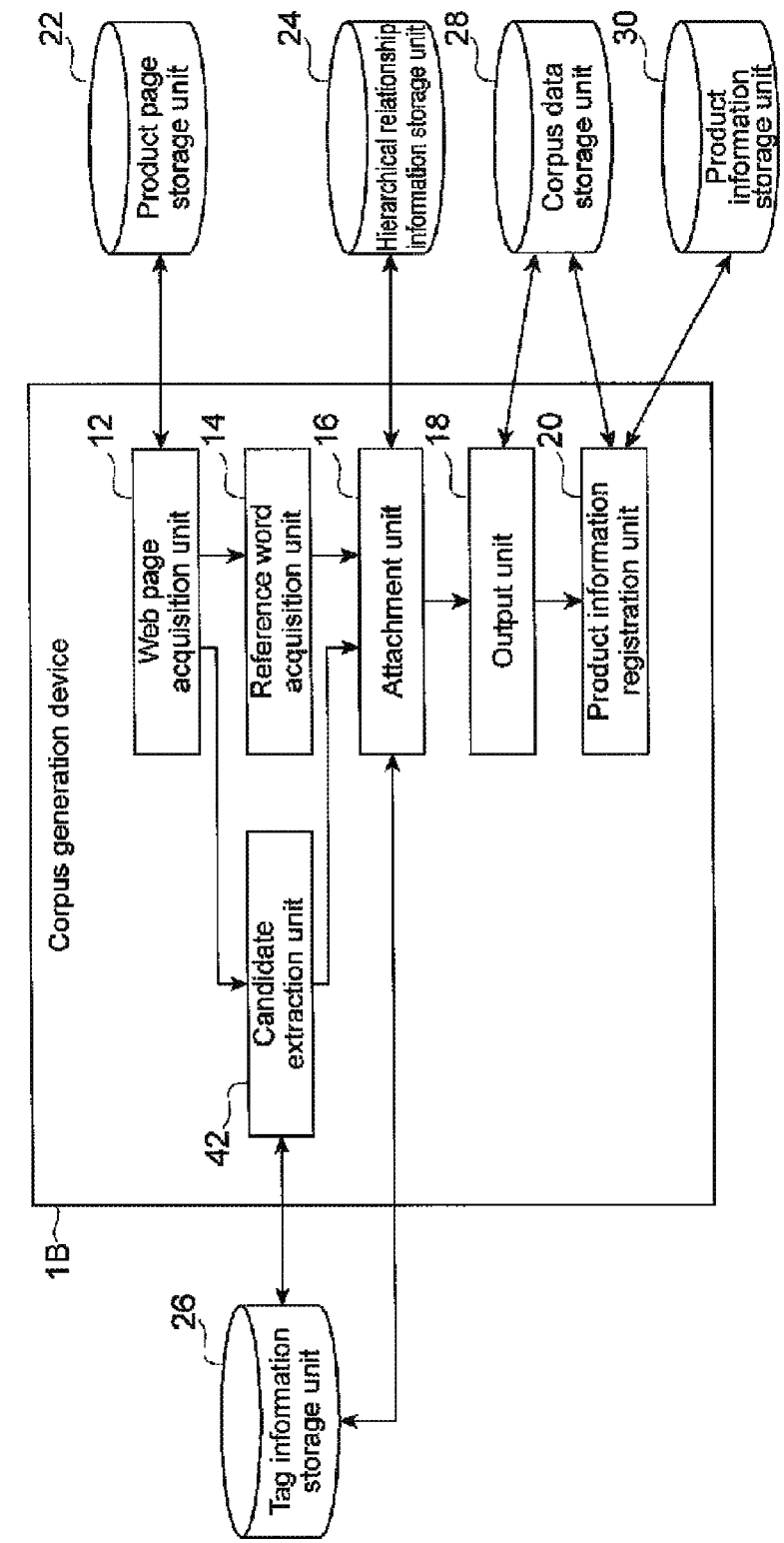
FIG. 17 is a diagram illustrating a functional configuration of a corpus generation device according to a third embodiment.

FIG. 17 is a diagram illustrating a functional configuration of the corpus generation device 1B. Further, the corpus generation device 1B includes a candidate extraction unit 42 in addition to the web page acquisition unit 12, the reference word acquisition unit 14, the attachment unit 16, the output unit 18, and the product information registration unit 20 as illustrated in FIG. 16.

The candidate extraction unit 42 is a functional element that extracts the candidate of the one or more attribute values included in the description sentence data by referring to a tag information storage unit (dictionary data storage unit) 26 that stores dictionary data in which the attribute value and the attribute name are associated. The candidate extraction unit 42 can have access to the tag information storage unit 26. The tag information storage unit 26 stores tag information in which the attribute name and an attribute value are associated, as described in the first embodiment. In this embodiment, this tag information functions as the dictionary data. The candidate extraction unit 42 extracts a phrase matching the attribute value of the dictionary data from the description sentence data and sets the extracted phrase as the candidate of the attribute value regarding the product. Further, the candidate extraction unit 42 acquires the attribute name corresponding to the extracted candidate of the attribute value from the dictionary data. The candidate extraction unit 42 outputs the candidate of this attribute value and the attribute name to the attachment unit 16.

In this embodiment, the attachment unit 16 extracts a word above the reference word acquired by the reference word acquisition unit 14 from the hierarchical relationship information storage unit 24, and attaches the attribute tag corresponding to the candidate of the attribute value to the candidate of the attribute value matching the broader word among the candidates of the attribute value included in the description sentence data. On the other hand, the attribute tag is not attached to the candidate of the attribute value not matching the broader word among the candidates of the attribute value included in the description sentence data. Further, the attachment unit 16 may also attach the attribute tag corresponding to the candidate of the attribute value to the candidate of the attribute value matching the reference word among the candidates of the attribute value included in the description sentence data.

Hereinafter, an example in which the attachment unit 16 attaches the attribute tag to the description sentence data will be described in detail with reference to FIGS. 4, 5, and 18. Here, the attachment unit 16 is assumed to attach the attribute tag corresponding to the candidate of the attribute value to the candidate of the attribute value matching the broader word or the reference word among the candidates of the attribute value included in the description sentence data.

FIG. 18(*a*) is a diagram illustrating an example of description sentence data D7 included in the product page. The description sentence data D7 includes "France," "Burgundy" and "Piedmont" as phrases regarding the place of origin. Here, a case in which the reference word acquisition unit 14 acquires "Burgundy" as the reference word from the product page and outputs this reference word to the attachment unit 16 will be described.

The candidate extraction unit 42 extracts the candidates of the one or more attribute values included in the description sentence data by referring to the dictionary data stored in the tag information storage unit 26. Here, the candidate extraction unit 42 extracts phrases "France," "Burgundy" and "Piedmont" included in the description sentence data D7 as candidates of the attribute value. Further, the candidate extraction unit 42 acquires an attribute name "Place of origin" corresponding to these phrases by referring to the dictionary data.

The attachment unit 16 searches for "Burgundy" that is the reference word from the hierarchical relationship information and extracts the broader word belonging to the layer above "Burgundy." Since the reference word "Burgundy" is included in a layer directly under the top layer in the hierarchical relationship information illustrated in FIG. 4, the attachment unit 16 extracts "France" belonging to the upper layer of "Burgundy" as the broader word. Then, the attachment unit 16 selects the candidate of the attribute value matching the broader word from among the candidates of the attribute value. Here, among candidates of the attribute value "France," "Burgundy" and "Piedmont," "France" matches the broader word and "Burgundy" matches the reference word, but "Piedmont" does not match the broader word or the reference word. Therefore, the attachment unit 16 attaches the attribute tag indicating the attribute name "Place of origin" to "France" and "Burgundy" matching the broader word or the reference word.

FIG. 18(*b*) is a diagram illustrating an example of description sentence data C7 to which the attribute tag is attached by the attachment unit 16. In description sentence data C7, an attribute tag is attached to phrases "France" and "Burgundy," and the attribute tag is not attached to a phrase "Piedmont," as illustrated in FIG. 18(*b*). This is because "Piedmont" does not match the broader word or the reference word, and thus is inferred not to be the attribute value indicating the feature of the product.

Further, in an embodiment, the attachment unit 16 may search for the partial tree having the reference word as the root node and having no branch from the hierarchical relationship information, extract one or more attribute values other than the reference word included in the partial tree, and attach the attribute tag corresponding to the candidate of the attribute value to the attribute value matching one or more attribute values among the candidates of the attribute value included in the description sentence data. Alternatively, when there are a plurality of attribute values on a layer directly under the reference word in the hierarchical relationship information and only one of the plurality of attribute values is included in the corpus data, the attachment unit 16 may further attach the attribute tag corresponding to the candidate of the attribute value to the attribute value matching the one attribute value among the candidates of the attribute value included in the description sentence data.

The attachment unit 16 outputs the description sentence data to which the attribute tag is attached to the output unit 18. The output unit 18 outputs the description sentence data output from the attachment unit 16 to the corpus data storage unit 28 as corpus data.

Figure 19:
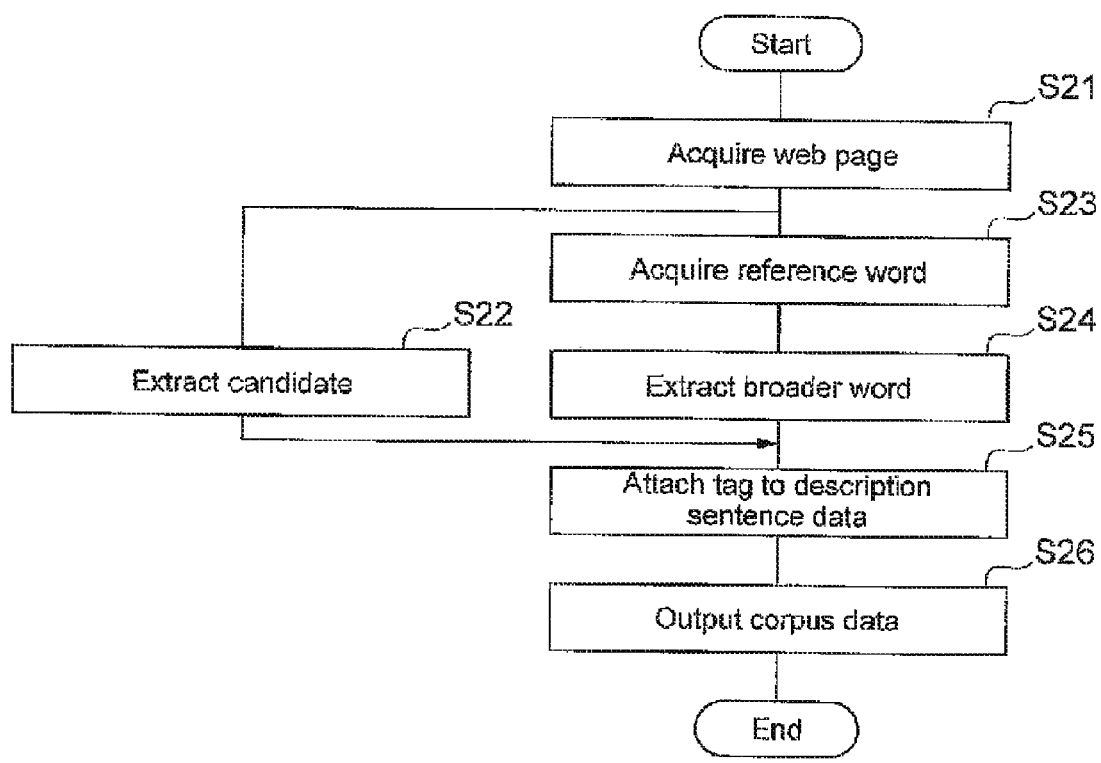
FIG. 19 is a flow diagram illustrating a process of a corpus generation method according to a third embodiment.

Next, an operation of the corpus generation device 1B, and a corpus generation method according to the third embodiment will be described using FIG. 19.

First, the web page acquisition unit 12 of the corpus generation device 1B acquires the web page including the description sentence data regarding the product from the product page storage unit 22 (step S21). Then, the candidate extraction unit 42 extracts the candidate of the one or more attribute values included in the description sentence data by referring to the tag information storage unit 26 that stores dictionary data (step S22; candidate extraction step). Then, the reference word acquisition unit 14 acquires the reference word from the web page acquired in step S21 (step S23). Then, the attachment unit 16 extracts the broader word that is an attribute value belonging to the layer above the reference word acquired in step S23 from the hierarchical relationship information stored in the hierarchical relationship information storage unit 24 (step S24).

Then, the attachment unit 16 attaches the attribute tag corresponding to the candidate of the attribute value to the attribute value that matches the broader word among the candidates of the attribute value included in the description sentence data (step S25). In this case, when the attribute value matching the reference word is included in the description sentence data, the attachment unit 16 may further attach the attribute tag corresponding to the candidate of the attribute value to the attribute value matching the reference word among the candidates of the attribute value included in the description sentence data. Further, the attachment unit 16 may search for the partial tree having the reference word as a root node and having no branch from the hierarchical relationship information, extract one or more attribute values other than the reference word included in the partial tree, and further attach the attribute tag corresponding to the candidate of the attribute value to the candidate of the attribute value matching the one or more attribute values among the candidates of the attribute value included in the description sentence data. Alternatively, when there are a plurality of attribute values on a layer directly under the reference word in the hierarchical relationship information and only one attribute value is included in the description sentence data among the plurality of attribute values, the attachment unit 16 may attach the attribute tag corresponding to the candidate of the attribute value to the candidate of the attribute value matching the one attribute value among the candidates of the attribute value included in the description sentence data.

Then, the output unit 18 stores the description sentence data to which the attribute tag is attached in step S25 in the corpus data storage unit 28 (step S26). As described above, the corpus generation device 1B generates corpus data.

Next, a corpus generation program according to the third embodiment will be described.

The corpus generation program includes a main module, a web page acquisition module, a reference word acquisition module, an attachment module, an output module, a product information registration module, and a candidate extraction module.

The main module is a portion that generally controls the corpus generation program. Functions realized by executing the web page acquisition module, the reference word acquisition module, the attachment module, the output module, the product information registration module and the candidate extraction module are the same as the functions of the web page acquisition unit 12, the reference word acquisition unit 14, the attachment unit 16, the output unit 18, the product information registration unit 20, and the candidate extraction unit 42 described above.

The corpus generation program according to this embodiment can also be distributed using various methods, similar to the corpus generation program P1 of the first embodiment.

As described above, according to the corpus generation device 1B, the attribute tag corresponding to the reference word is attached to the attribute value matching the broader word among the candidates of the attribute value included in the description sentence data. When the reference word is an attribute value regarding the product, the broader word is inferred to be the attribute value regarding the product. On the other hand, the attribute value different from the reference word and the broader word is inferred not to be the attribute value regarding the product. In the corpus generation device 1B, since the attribute tag corresponding to the candidate of the attribute value is attached to the candidate of the attribute value matching the broader word among the candidates of the attribute value included in the description sentence data, it is possible to prevent the attribute tag from being incorrectly attached to a phrase that is not the attribute value regarding the product.

The present invention has been described in detail above based on the embodiments. However, the present invention is not limited to the above-described embodiments. Various variations can be made to the present invention without departing from the gist of the present invention.

For example, while the example in which the attribute tag is attached to the description sentence data of the product included in the product page for wine has been described in the above-described embodiment, the attribute tag may be attached to description sentence data of a product page regarding a product other than wine. Further, the corpus generation device 1 may attach, for example, an attribute tag other than the place of origin, such as "Variety," "Type," or "Capacity" to the description sentence data.

While the same attribute tag is attached to, for example, the broader word and the reference word of the description sentence data in the above-described embodiment, different attribute tags may be given to the words. For example, when the broader word is "France" and the reference word is "Burgundy," an attribute tag regarding the attribute name "country" may be attached to the broader word, and an attribute tag regarding the attribute name "district" may be attached to the reference word.

REFERENCE SIGNS LIST

1: Corpus generation device, 12: Web page acquisition unit, 14: Reference word acquisition unit, 16: Attachment unit, 18: Output unit, 20: Product information registration unit, 22: Product page storage unit, 24: Hierarchical relationship information storage unit, 26: Tag information storage unit, 28: Corpus data storage unit, 30: Product information storage unit, 32: Corpus acquisition unit, 36: Removal unit, 42: Candidate extraction unit, D1 to D5 and D7: Description sentence data, C2 to C7: Description sentence data, L1 and L2: Attribute list, M1: Product page, N: Network, P1: Corpus generation program, P2: Main module, P3: Web page acquisition module, P4: Reference word acquisition module, P5: Attachment module, P6: Output module, P7: Product information registration module, PT: Partial tree.

The invention claimed is:

1. A corpus generation device for generating accurate corpus data of presentation targets for use in a search operation for the presentation targets, the corpus generation device comprising:
   at least one non-transitory memory configured to store computer program code; and
   at least one processor operable to access said memory and execute said computer program code, said computer program code comprising:
   web page acquisition code configured to cause at least one of said at least one processor to acquire a web page including description sentence data regarding a presentation target;
   reference word acquisition code configured to cause at least one of said at least one processor to acquire a reference word that is an attribute value regarding the presentation target from the web page;
   attachment code configured to cause at least one of said at least one processor to extract a broader word belonging to a layer above the reference word acquired according to the reference word acquisition code from a storage configured to store hierarchical relationship information indicating a hierarchical relationship between attribute values, and to attach an attribute tag, indicating an attribute name, corresponding to the reference word to the broader word included in the description sentence data when the broader word is included in the description sentence data; and
   output code configured to cause at least one of said at least one processor to output, as corpus data, the description sentence data to which the attribute tag is attached in accordance with the attachment code,
   wherein the corpus generation device further comprises a presentation target information registration storage configured to store a set of the attribute name and the attribute value regarding the presentation target generated by machine learning using the corpus data output in accordance with the output code in association with the web page, and
   wherein, when a search for the presentation target is requested, the presentation target is searched by referring to the presentation target information registration storage based on the attribute name and the attribute value regarding the presentation target.

2. The corpus generation device according to claim 1, wherein the attachment code is further configured causes at least one of said at least one processor to, when the reference word is included in the description sentence data, attach the attribute tag corresponding to the reference word to the reference word included in the description sentence data.

3. The corpus generation device according to claim 1, wherein the web page further includes an attribute list in which the attribute name and the attribute value regarding the presentation target are associated, and
wherein the reference word acquisition code is further configured to cause at least one of said at least one processor to acquire the attribute value in the attribute list as the reference word.

4. The corpus generation device according to claim 1, wherein the reference word acquisition code is further configured to cause at least one of said at least one processor to search for a word having a high probability of being an attribute value regarding the presentation target from the description sentence data using a sentence structure analyzer, and acquire the searched word as the reference word.

5. The corpus generation device according to claim 1, wherein the hierarchical relationship information has a tree structure having the attribute value as a node, and
wherein the attachment code is further configured to cause at least one of said at least one processor to search for a partial tree having the reference word as a root node and having no branch from the hierarchical relationship information, extract one or more attribute values other than the reference word included in the partial tree, and attach the attribute tag corresponding to the reference word to the one or more attribute values included in the description sentence data when the one or more attribute values are included in the description sentence data.

6. The corpus generation device according to claim 1, wherein the hierarchical relationship information hierarchically indicates the hierarchical relationship between the attribute values, and
wherein the attachment code is further configured to cause at least one of said at least one processor to, when there are a plurality of attribute values on a layer directly under the reference word in the hierarchical relationship information and only one of the plurality of attribute values is included in the description sentence data, attach the attribute tag corresponding to the reference word to the one attribute value included in the description sentence data.

7. The corpus generation device according to claim 1, wherein the machine learning is performed on the corpus data and, based on a result of the machine learning, an attribute list of a second presentation target in a second web page, the second web page including description sentence data regarding the second presentation target, is automatically generated.

8. A corpus generation method for generating accurate corpus data of presentation targets for use in a search operation for the presentation targets, the corpus generation method comprising:
 a web page acquisition step of acquiring a web page including description sentence data regarding a presentation target;
 a reference word acquisition step of acquiring a reference word that is an attribute value regarding the presentation target from the web page;
 an attachment step of extracting an broader word belonging to a layer above the reference word acquired in the reference word acquisition step from a storage that stores hierarchical relationship information indicating a hierarchical relationship between attribute values, and attaching an attribute tag, indicating an attribute name, corresponding to the reference word to the broader word included in the description sentence data when the broader word is included in the description sentence data;
 an output step of outputting, as corpus data, the description sentence data to which the attribute tag is attached in the attachment step; and
 a storing step of storing, in a presentation target information registration storage, a set of the attribute name and the attribute value regarding the presentation target acquired from the corpus data output, in the output step, in association with the web page,
 wherein, when a search for the presentation target is requested, the presentation target is searched by referring to the presentation target information registration storage based on the attribute name and the attribute value regarding the presentation target.

9. The corpus generation method of claim 8, wherein the web page acquisition step comprises receiving the web page from a server.

10. The corpus generation method of claim 9, wherein the output step comprises transmitting the corpus data to the server.

11. The corpus generation method of claim 9, further comprising:

a registration step of registering the attribute tag and the corresponding reference word and broader word included in the description sentence data with the presentation target, and
 a second output step of transmitting the registered attribute tag and the corresponding reference word and broader word included in the description sentence data to the server.

12. A corpus generation device for generating accurate corpus data of presentation targets for use in a search operation for the presentation targets, the corpus generation device comprising:
 at least one non-transitory memory configured to store computer program code; and
 at least one processor operable to access said memory and execute said computer program code, said computer program code comprising:
  web page acquisition code configured to cause at least one of said at least one processor to acquire a web page including description sentence data regarding a presentation target;
  candidate extraction code configured to cause at least one of said at least one processor to extract a candidate of an attribute value regarding the presentation target included in the description sentence data by referring to a dictionary data storage configured to store dictionary data in which an attribute name and the attribute value are associated;
  reference word acquisition code configured to cause at least one of said at least one processor to acquire a reference word that is an attribute value regarding the presentation target from the web page;
  attachment code configured to cause at least one of said at least one processor to extract an broader word belonging to a layer above the reference word acquired in accordance with the reference word acquisition code from a storage configured to store hierarchical relationship information indicating a hierarchical relationship between attribute values, and attach an attribute tag, indicating the attribute name, corresponding to the candidate of the attribute value to the candidate of the attribute value matching the broader word among the candidates of the attribute value included in the description sentence data; and
  output code configured to cause at least one of said at least one processor to output, as corpus data, the description sentence data to which the attribute tag is attached in accordance with the attachment code,
 wherein the corpus generation device further comprises a presentation target information registration storage configured to store a set of the attribute name and the attribute value regarding the presentation target generated by machine learning using the corpus data output in accordance with the output code in association with the web page, and
 wherein, when a search for the presentation target is requested, the presentation target is searched by referring to the presentation target information registration storage based on the attribute name and the attribute value regarding the presentation target.

13. A corpus generation method for generating accurate corpus data of presentation targets for use in a search operation for the presentation targets, the corpus generation method comprising:

a web page acquisition step of acquiring a web page including description sentence data regarding a presentation target;

a candidate extraction step of extracting a candidate of an attribute value regarding the presentation target included in the description sentence data by referring to a dictionary data storage that stores dictionary data in which an attribute name and the attribute value are associated;

a reference word acquisition step of acquiring a reference word that is an attribute value regarding the presentation target from the web page;

an attachment step of extracting an broader word belonging to a layer above the reference word acquired in the reference word acquisition step from a storage that stores hierarchical relationship information indicating a hierarchical relationship between attribute values, and attaching an attribute tag, indicating the attribute name, corresponding to the candidate of the attribute value to the candidate of the attribute value matching the broader word among the candidates of the attribute value included in the description sentence data;

an output step of outputting, as corpus data, the description sentence data to which the attribute tag is attached in the attachment step;

a storing step of storing, in a presentation target information registration storage, a set of the attribute name and the attribute value regarding the presentation target generated by machine learning using the corpus data output, in the output step, in association with the web page, wherein, when a search for the presentation target is requested, the presentation target is searched by referring to the presentation target information registration storage based on the attribute name and the attribute value regarding the presentation target.

* * * * *